United States Patent
Ozbay (10) Patent No.: US 9,754,211 B2
(45) Date of Patent: Sep. 5, 2017

(54) INCREMENTALITY MODELING

(71) Applicant: eBay Inc., San Jose, CA (US)

(72) Inventor: Andes Ozbay, San Jose, CA (US)

(73) Assignee: eBay Inc., San Jose, CA (US)

( * ) Notice: Subject to any disclaimer, the term of this patent is extended or adjusted under 35 U.S.C. 154(b) by 376 days.

(21) Appl. No.: 14/573,985

(22) Filed: Dec. 17, 2014

(65) Prior Publication Data

US 2016/0180228 A1    Jun. 23, 2016

(51) Int. Cl.
  *G06N 5/00* (2006.01)
  *G06F 1/00* (2006.01)
  *G06N 5/04* (2006.01)

(52) U.S. Cl.
  CPC .................... *G06N 5/045* (2013.01)

(58) Field of Classification Search
  CPC   G06N 5/04; G06N 5/02; G06N 5/022; G06Q 50/01
  See application file for complete search history.

(56) References Cited

U.S. PATENT DOCUMENTS

| | | | | |
|---|---|---|---|---|
| 5,264,459 A | * | 11/1993 | Chelmicka-Schorr | A61K 31/00 514/646 |
| 2006/0224421 A1 | * | 10/2006 | St. Ores | A61B 5/0031 705/4 |
| 2014/0375650 A1 | * | 12/2014 | Grundstrom | G06T 11/206 345/440 |

* cited by examiner

*Primary Examiner* — Stanley K Hill
*Assistant Examiner* — Kalpana Bharadwaj
(74) *Attorney, Agent, or Firm* — Schwegman Lundberg & Woessner, P.A.

(57) ABSTRACT

A decision tree methodology based uplift modeling approach, wherein one decision tree is developed simultaneously on test and control groups with the objective of maximizing the mean-difference in identified subsets within the data. The incrementality modeling approach discussed may be applied in any situation where an incrementality model is required to determine who among a group of users should be exposed to a treatment with the goal of receiving a positive response.

18 Claims, 7 Drawing Sheets

INCREMENTALITY MODELING

TECHNICAL FIELD

The present application relates generally to data processing systems and, in one specific example, to techniques and applications for incrementality modeling.

BACKGROUND

Uplift modeling, also known as incremental modeling, is a predictive modeling technique that directly models the incremental impact of a treatment (such as direct marketing action) on an individual's behavior. Uplift modeling uses a control to not only measure the effectiveness of a marketing action but also to build a predictive model that predicts the incremental response to the marketing action. Currently uplift models are developed are developed by either looking at test and control populations separately, or by using one model with the treatment effect coded as a dummy variable and all possible interaction effects included in the model. These methodologies have several shortcomings, such as inefficient use of available data, and an inability to capture complex interactions between independent variables thereby limiting use to binary outputs.

BRIEF DESCRIPTION OF THE DRAWINGS

Some embodiments are illustrated by way of example and not limitation in the figures of the accompanying drawings in which.

DETAILED DESCRIPTION

Example methods and systems for incrementality modeling and email targeting with incrementality modeling are described. In the following description, for purposes of explanation, numerous specific details are set forth in order to provide a thorough understanding of example embodiments. It will be evident, however, to one skilled in the art that the present invention may be practiced without these specific details.

A novel decision tree methodology based uplift modeling approach is described where one decision tree is developed simultaneously on test and control groups with the objective of maximizing the difference in a target variable between pairs of branches of the same decision tree. The "uplift" of a marketing campaign is defined as the difference in response rate between a treated group and a control group. In this way, the effect of a treatment can be isolated and measured for effectiveness. The approach discussed herein addresses the shortcomings of the previous approaches described above, where the available data is partially and inefficiently used, and the complex interactions between independent variables are not fully captured. This approach may be applied in any situation where an incrementality model is required to determine who among a group of users should be exposed to a treatment with the goal of receiving a positive response. In an example embodiment, the incrementality model is applied to identify recipients for targeted content, with the expectation that the recipients will provide uplift.

Figure 1:
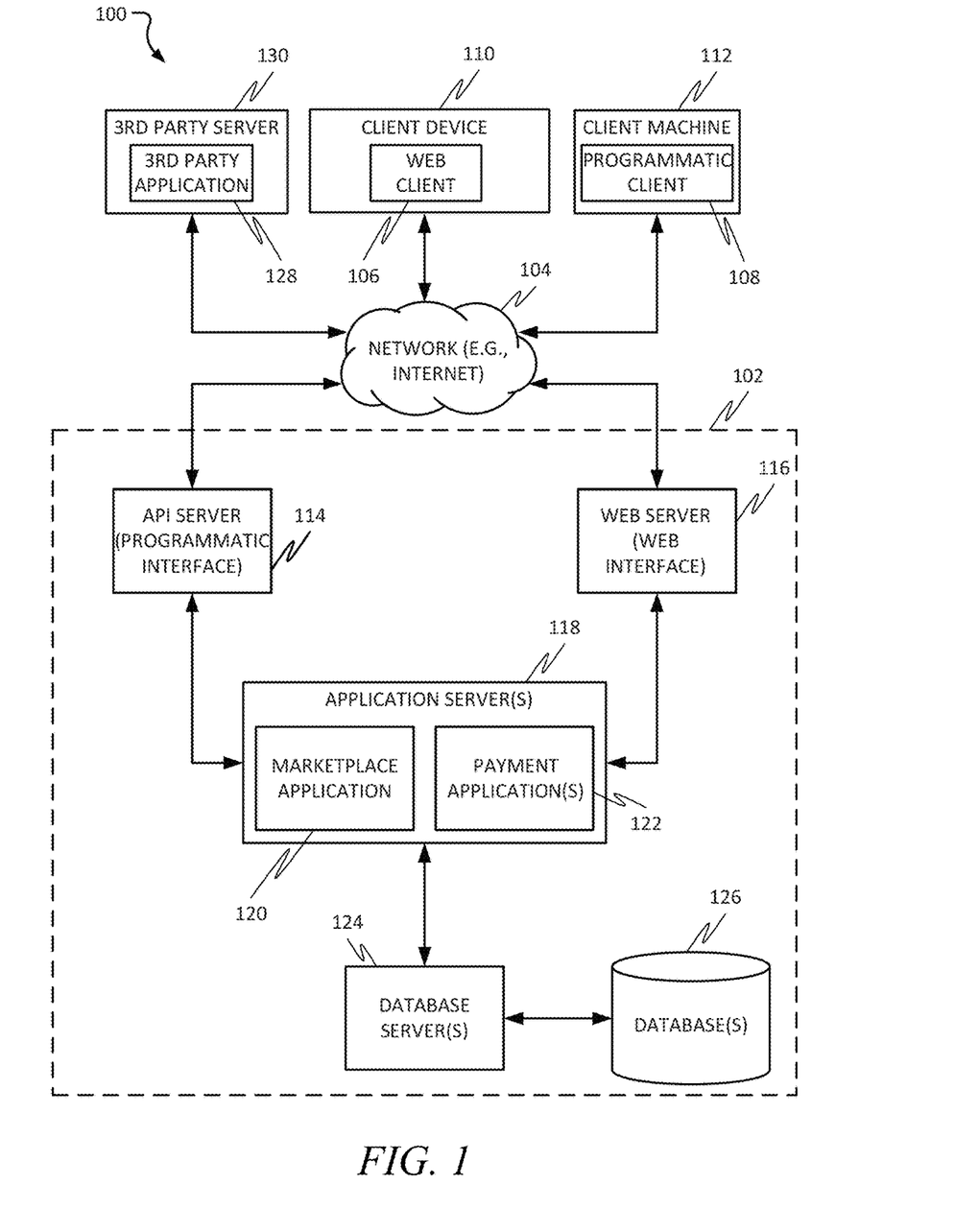
FIG. 1 is a network diagram depicting a client-server system, within which one example embodiment may be deployed.

FIG. 1 is a network diagram depicting a client-server system 100, within which one example embodiment may be deployed. A networked system 102, in the example form of a network-based marketplace or publication system, provides server-side functionality, via a network 104 (e.g., the Internet or a Wide Area Network (WAN)), to one or more clients. FIG. 1 illustrates, for example, a web client 106 (e.g., a browser, such as the INTERNET EXPLORER® browser developed by MICROSOFT® Corporation of Redmond, Wash. State) and a programmatic client 108 executing on respective client machines 110 and 112.

An Application Program interface (API) server 114 and a web server 116 are coupled to, and provide programmatic and web interfaces respectively to, one or more application servers 118. The application servers 118 host one or more marketplace applications 120 and payment applications 122 which supply data to the database 126, to be used by the incrementality modeling system 234. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the Turbo Lister application developed by eBay Inc., of San Jose, Calif.) to enable sellers to author and manage listings on the networked system 102 in an offline manner, and to perform batch-mode communications between the programmatic client 108 and the networked system 102.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more promotional, marketplace, or payment functions that are supported by the relevant applications of the networked system 102.

Figure 2:
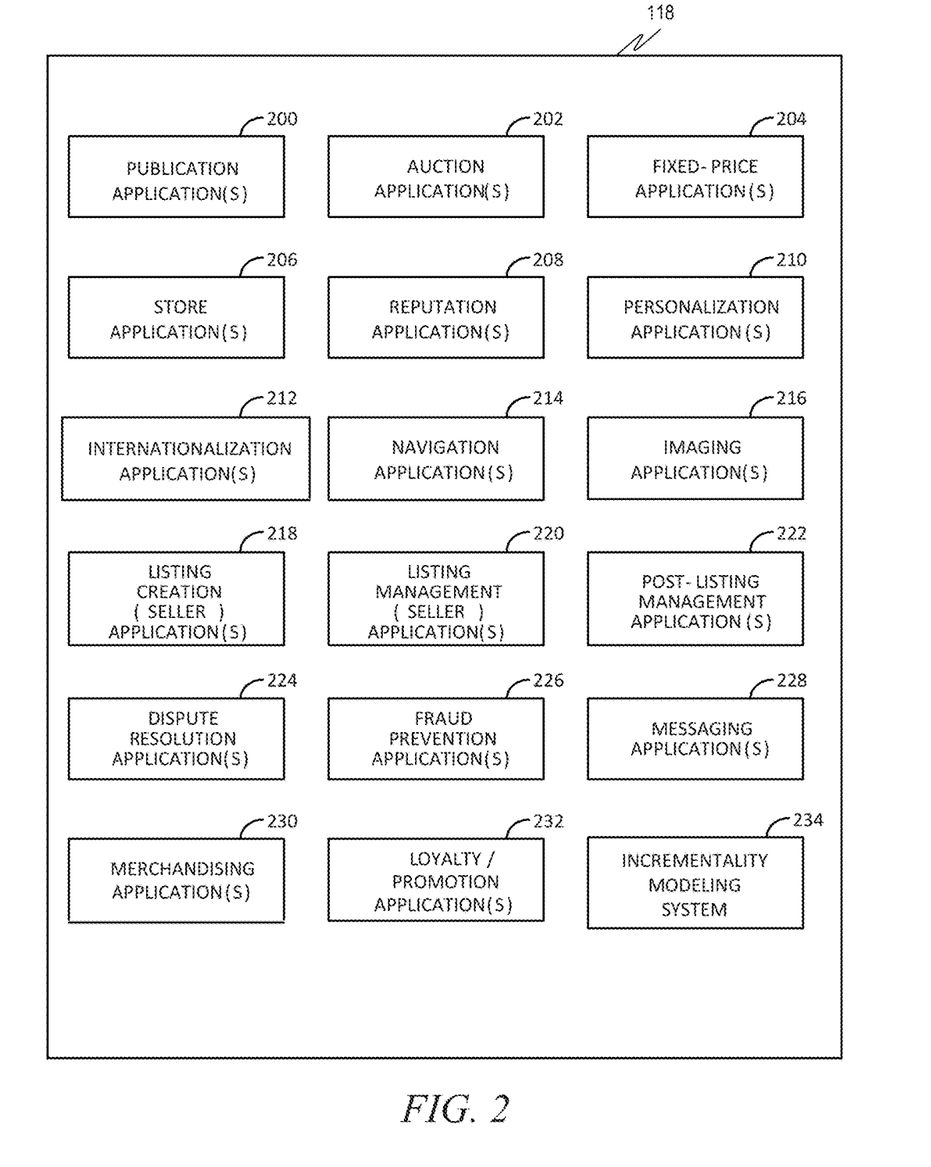
FIG. 2 is a block diagram of an example system, according to various embodiments.

FIG. 2 is a block diagram illustrating marketplace and payment applications 120 and 122 that, in one example embodiment, are provided as part of application server(s) 118 in the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example, a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information by the networked system 102) according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browse applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third-party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or providing promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks 104.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotion points for each transaction established and/or concluded with a particular seller, and be offered a reward for which accumulated loyalty points can be redeemed.

Referring back to FIG. 1 above, database 126 may store one or more listings of products for sale by a first ecommerce service. In an example embodiment, these one or more listings of products may be stored in, or at least with reference to, a first product taxonomy. Generally, a taxonomy is a scheme of classification, and thus a product taxonomy is a scheme of classifying products. Often a product taxonomy will take the form of a tree of categories that helps classify a product. For example, a television may be assigned to a category of Electronics, and a sub-category of televisions. It should be noted, however, that these types of taxonomies are merely examples and it is not mandatory that the product taxonomy take the form of a tree of categories.

Referring back to FIG. 2, an incrementality modeling system 234 may act to perform incremental modeling functions on test and control data gathered from various sources including the marketplace application 120, and payment application 122, which may be stored in database 126. In an example embodiment, this may include obtaining test and control data stored in the database 126 of FIG. 1, dividing the test and control data in microsegments, wherein the microsegments are defined by one or more identifying variables, comparing the corresponding microsegments of the test and control data, identifying the microsegment representing the most significant difference in the test data and the control data, generating a list of the identification variables corresponding to the identified microsegment, selecting users having the identification variables, and finally delivering targeted content to the selected users, with the expectation that the selected users are those most likely to provide uplift.

Figure 3:
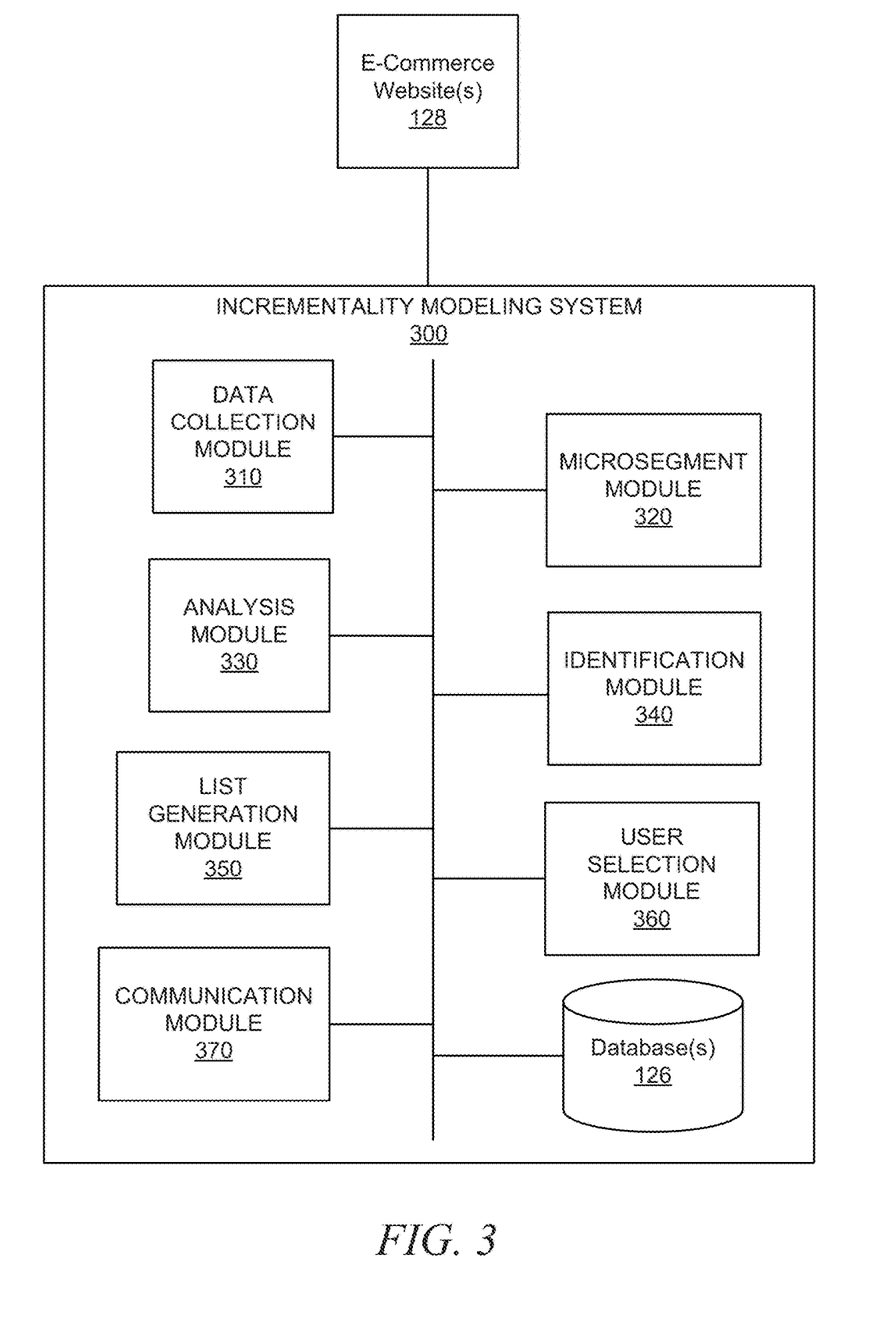
FIG. 3 is a flowchart illustrating a method 300 for identifying users to target using incrementality modeling, in accordance with an example embodiment.

FIG. 3 is a block diagram illustrating various functional modules of an incrementality modeling system 234, consistent with some embodiments. The incrementality modeling system 234 is shown as including: a data collection module 310; a microsegment module 320; an analysis module 330; an identification module 340; a list generation module 350; a user selection module 360, and a communication module 370. The various modules of the incrementality modeling system 234, may, furthermore, access the database 126 via the database server 124, and each of the various modules of the incrementality modeling system 124 may be in communication with one or more of the third party applications 128 (e.g., a social network platform). Further, while the modules of FIG. 3 are discussed in the singular sense, it will be appreciated that in other embodiments multiple modules may be employed.

The data collection module 310 is configured to obtain test and control data, wherein the test and control data include an output value, and one or more identification variables, from the database 126. The test data represents users who received a treatment, while the control data represents users who did not receive the treatment. The treatment affecting the test group represents direct marketing action. In some embodiments, the treatment is an email, incentives, or targeted content sent to a test group of users, wherein the incrementality module 234 seeks to isolate and measure the overall impact of the treatment on the behavior of the test group.

In some embodiments, the output value may be a binary value, for example whether or not a user performed a particular task such as opening an email, or responding to targeted content. In other embodiments, the output value may be a continuous value, such as a numerical value representing the gross merchandise bought (GMB) by users. The identification variables used to represents the microsegments include: site activity, such as items viewed, search results viewed, transaction history, and visit length; demographics information, such as gender, occupation, age, income, marital status, dwelling status, number of people in household, number of children; product affinity, such as identification information corresponding to habitual purchasing habits from a particular category or brand; and previous communications, such as a number and type of communications sent to a user.

The microsegment module 320 is configured to separate the test and control data into one or more microsegments, wherein each microsegment is defined by one or more identification variables. For example, the microsegment module 320 may divide and separate the test and control data into a plurality of subsets representing combinations of identification variables, wherein the addition of an identification variable represents a division of the data, and the creation of a distinct subset. For example, one subset may represent "male users," another subset may represent "male users, between the ages of 18 and 32," and another subset may represent "male users, between the ages of 18 and 32, who frequently purchase NIKE® products." The microsegment module 320 may further be configured to include stopping criteria to define a maximum number of divisions to apply to a dataset, wherein each division represents an added identification variable. In some embodiments the stopping criteria may be operator defined, such that the operator may manually provide a maximum number of identification variables to be used to define a microsegment, while in other embodiments the stopping criteria may be to divide the dataset so tong as there is a statistically significant difference in mean between the corresponding microsegments of the test group data and the control group data.

The analysis module 330 is configured to compare the microsegments of the test group data and the control group data, and identify whether or not there is a statistically significant difference in corresponding means. For example, after the microsegment module 320 divides a dataset into one or more subsets of microsegments defined by sets of identification variables, the analysis module 330 may apply a t-test to measure a difference in mean between two paired samples of microsegments from the test group data and the control group data. A t-test is any statistical hypothesis test used to determine if two sets of data are significantly different from each other. If the analysis module 330 determines that two sets of data satisfy a specified statistical significance, then the microsegment module may continue applying identification variables to separate the dataset into one or more subsets of microsegments. Should the analysis module 330 determine that the addition of identification variables does not provide a statistically significant difference in mean, then the stopping criteria may be satisfied. In some embodiments, the analysis module 330 is further configured to identify the microsegments corresponding to the greatest mean difference between test and control groups.

The identification module 340 is configured to identify the microsegment and corresponding identification variables within the test and control data, representing the greatest difference in corresponding means. By doing so, the incrementality modeling system 234 may identify the microsegment and its defining identification variables representing the greatest measureable effect from the treatment administered on the test group.

The list generation module 350 is configured to receive data corresponding to the microsegment identified by the identification module 340, and responsive to receiving the data, generate a list of identification variables corresponding to the test group with the greatest measured response effect to receiving the treatment.

The user selection module 360 is configured to receive the list generated by the list generation module 350 and responsive to receiving the list, identify and select users sharing the one or more identification variables identified. The user selection module 360 may then create a group of users, with the expectation that the group of users will respond favorably to future treatments, thereby providing an uplift. The communication module 370 is configured to deliver content to the users selected by the user selection module 360.

Figure 4:
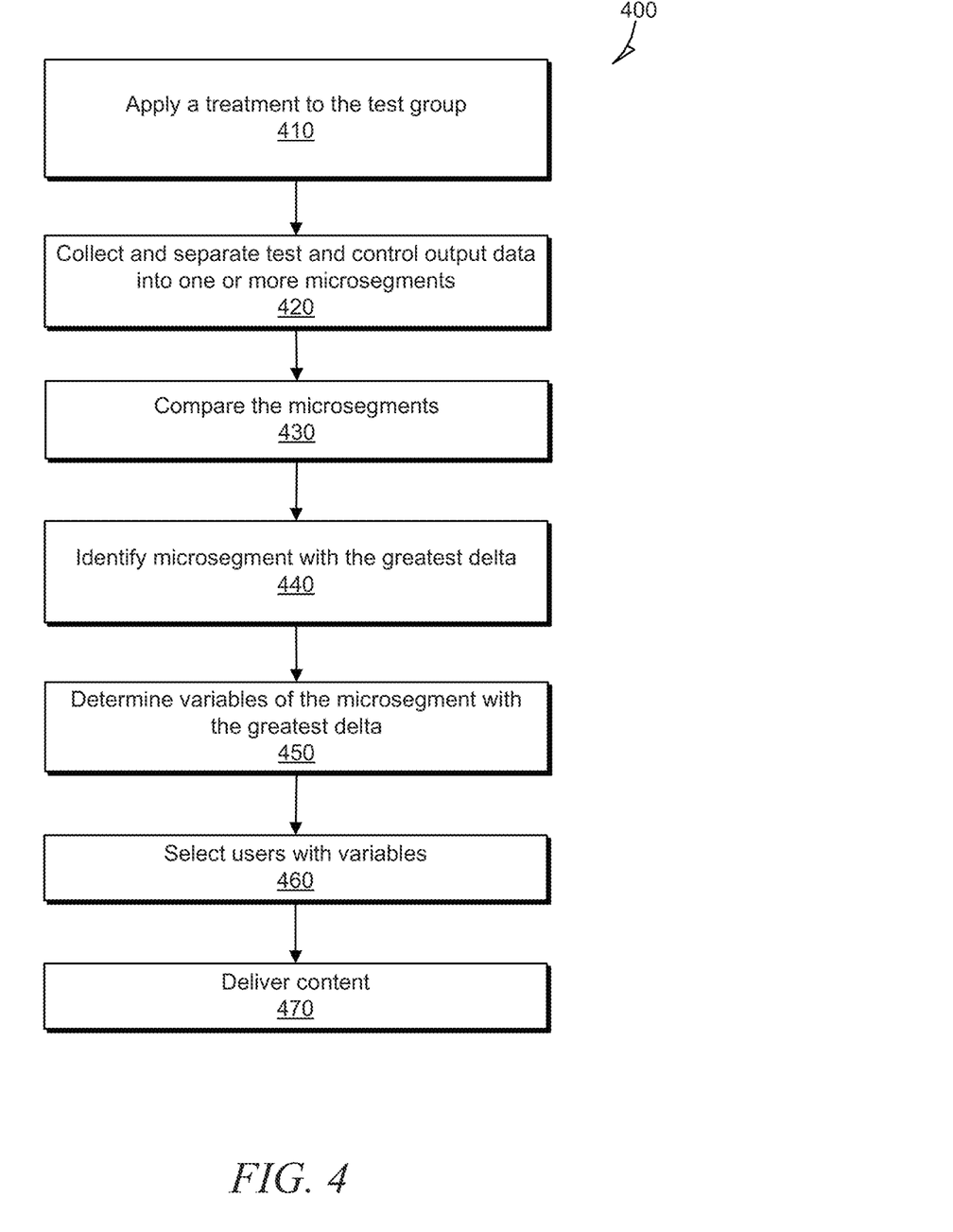
FIG. 4 is a flowchart illustrating a method 400 for identifying microsegments within test and control data, in accordance with an example embodiment.

FIG. 4 is a flowchart illustrating a method 400 for applying the disclosed incrementality modeling techniques to generate a list of users to receive targeted content, with the expectation that the users will respond favorably to the targeted content. At operation 410, a group of users having is selected and divided into a control group and a test group. The individuals within the group of users are defined by one or more identification variables. A treatment is applied to the test group. In some embodiments the treatment is an email delivered to an email address, purchasing incentives, as well as content requesting the user's response, delivered to a targeted recipient. The responsive actions and identification variables of the test group to the receipt of the treatment are then stored within database 126 as test group data. The normal baseline actions of the control group and their corresponding identification variables over the same period of time are stored within the database 126 as control group data. The test and control output data include binary results, as well as continuous values, such as, for example, numerical values representing GMB in a marketplace.

At operation 420, the data collection module 310 collects the test and control output data, as well as the corresponding identification variables from the database 126. Once the data has been collected by the data collection module 310, the microsegment module 320 divides the test and control data into one or more microsegments, wherein each microsegment is defined as a combination of identification variables. Each microsegment therefore represents a specific group of users with corresponding output data, the group of users being identifiable by the corresponding combination of identification variables, in some embodiments, the microsegment module 320 is configured to continue to separate the data into microsegments until certain stopping criteria is satisfied. The stopping criteria may be a predefined maximum number of identification variables which may be used to define the microsegments, for example by user selection, or in other embodiments the microsegment module 320 automatically limits the maximum number of microsegments based on the calculated difference in mean of the test and control group microsegments. For example, the microsegment module 320 may be configured to divide a dataset into microsegments so long as there is a statistically significant difference in mean between the corresponding microsegments of the test group data and the control group data.

At operation 440, the analysis module 330 is configured to analyze the microsegments of the test and control data identified by the microsegment module 320, and compare them in order to calculate a mean-difference between the corresponding microsegments of the test and the control data. The analysis module 330 may apply a t-test in order to determine whether or not the identified microsegments have a statistically significant difference in mean. After calculating the corresponding differences in mean between test and control microsegments, the analysis module 330 may identify the microsegments with the greatest difference in mean. The microsegment with the greatest difference in mean between test and control data would therefore correspond to the group of users having the most significant response reaction from the applied treatment. The analysis module 330 may then isolate and measure the effects of the treatment on the test group.

At operation 450, after the analysis module 330 calculates the mean-differences of the microsegments, the identification module 340 identifies the identification variables corresponding to the microsegment with the greatest difference in mean between test and control output values. The identified identification variables therefore correspond to the group of users associated with the greatest response effect as a result of receiving the treatment. In some embodiments, the list generation module 350 may then generate a list of the identified identification variables.

At operation 460, responsive to receiving the identified identification variables, the user selection module 360 selects users who share the same identification variables as the microsegment representing the greatest mean-difference. At operation 470, the content delivery module 370 may then deliver newly created content to the selected users, wherein the newly created content may be more narrowly tailored with the expectation that the user's receiving the newly created content will be more likely to respond favorably, and thereby provide uplift.

Figure 5:
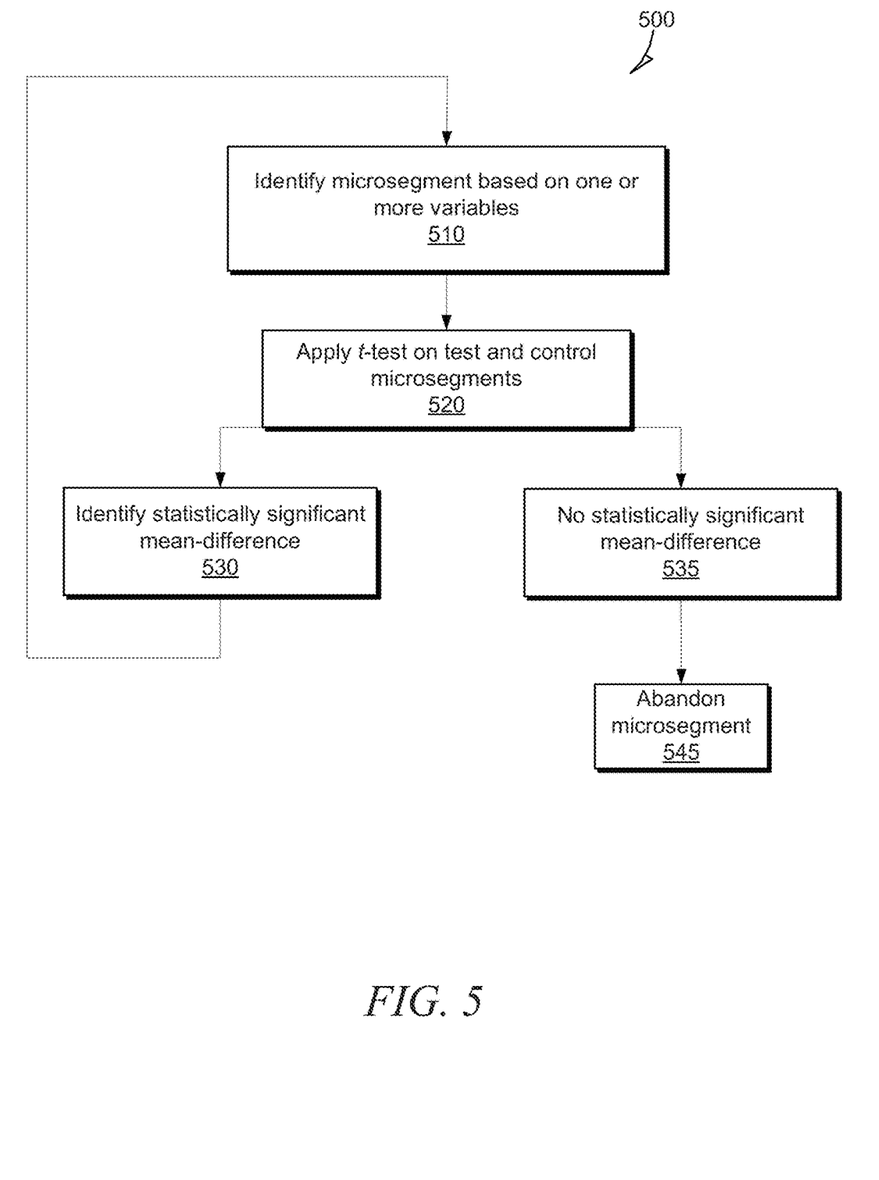
FIG. 5 is a flowchart illustrating a method 500 for separating test and control data into microsegments, with stopping criteria, in accordance with an example embodiment.

FIG. 5 is a flowchart is a flowchart illustrating a method 500 for separating test and control data into microsegments, with stopping criteria, as was described in operation 430 of FIG. 4, in accordance with an example embodiment. The microsegment module 320 is configured to identify and divide the test and control data into one or more microsegments, wherein each microsegment represents a combination of identification variables. The maximum number of microsegments which the microsegment module 320 can divide a data set into is limited by the total number of available identification variables, wherein at best, one microsegment could correspond to a single identification variable. However, as not every identification variable may correspond to a significant difference between test output value and control output value, the microsegment module 320 is configured to first identify and divide the data into a microsegment based on identification variables, then through the analysis module 330, determine whether or not the microsegments correspond to a statistically significant mean-difference. If there is no statistically significant difference in mean, then the identified microsegment is abandoned.

At operation 510 the microsegment module 320 identifies a microsegment corresponding to a subset of the test group data and control group data, defined by one or more identification variables. In some embodiments, the identification variables may include: site activity, such as items viewed, search results, transaction history and visit length; demographics information, such as gender, occupation, age, income, marital status, dwelling status, number of people in household, and number of children; product affinity, defined as habitual purchasing behavior from a particular category or brand; and previous communications, such as frequency of communication, type of communication sent, and content of the communication.

At operation 520, the analysis module 330 compares the identified microsegment with corresponding identification variables of the test group with its corresponding microsegment pair having matching identification variables, from the control group. In some embodiments, the analysis module 330 is configured to determine whether or not the microsegment pairs have a statistically significant difference in corresponding average values. For example, the analysis module 300 may first calculate a mean corresponding to the test and control group outputs represented by each of the identified microsegments. After determining the average value of the microsegments, the analysis module 330 may then perform a t-test to determine whether or not the two microsegments correspond to a statistically significant mean-difference. If there is not a statistically significant mean-difference between the test group data of a microsegment, and the control group data of the microsegment, the identified microsegment is abandoned and another microsegment is separated and identified by the microsegment module 320.

At operation 530, if the analysis module 330 calculates a statistically significant mean-difference between the microsegment of the test group data and the control group data, the identified microsegment and its corresponding identification variables are stored in the database 126. Alternatively, at operation 535, if the t-test administered by the analysis module 330 shows that there is no statistically significant mean-difference between the corresponding microsegments of the test group data and the control group data, then at operation 545 the identified microsegment is abandoned. The microsegment module 320 may be configured to identify as many microsegments as there are iterations of identification variable combinations, and to store the identified microsegments having a statistically significant mean-difference, while abandoning the microsegments without a statistically significant mean-difference.

Figure 6A:
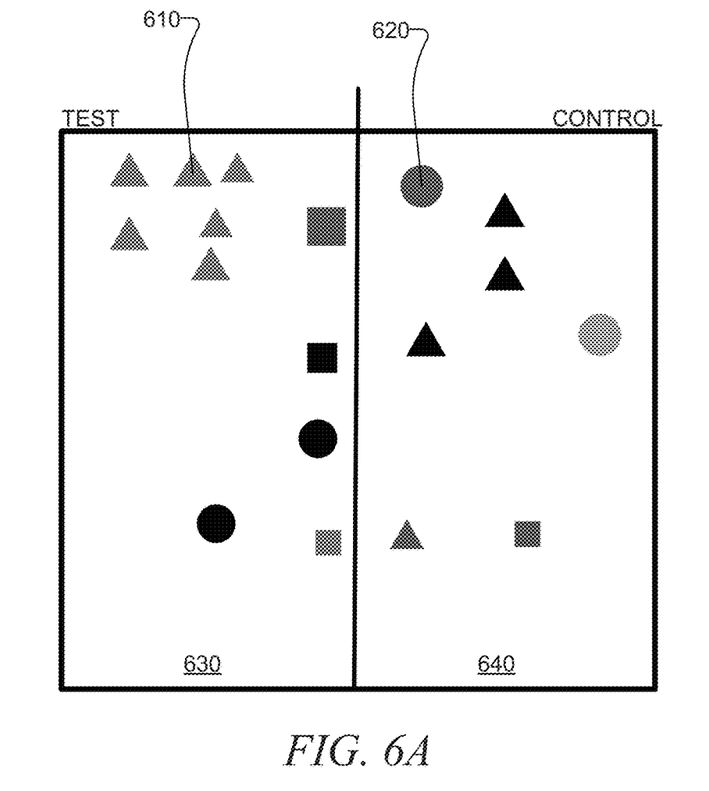
FIG. 6A depicts a diagram illustrating test and control data, in accordance with an example embodiment.

FIG. 6A depicts a diagram illustrating test group data 630 and control group data 640, in accordance with an example embodiment. For example, data point 610 has a corresponding test output value, and identification variables associated with it, while data point 620 represents a control output value with its own corresponding identification variables.

Figure 6B:
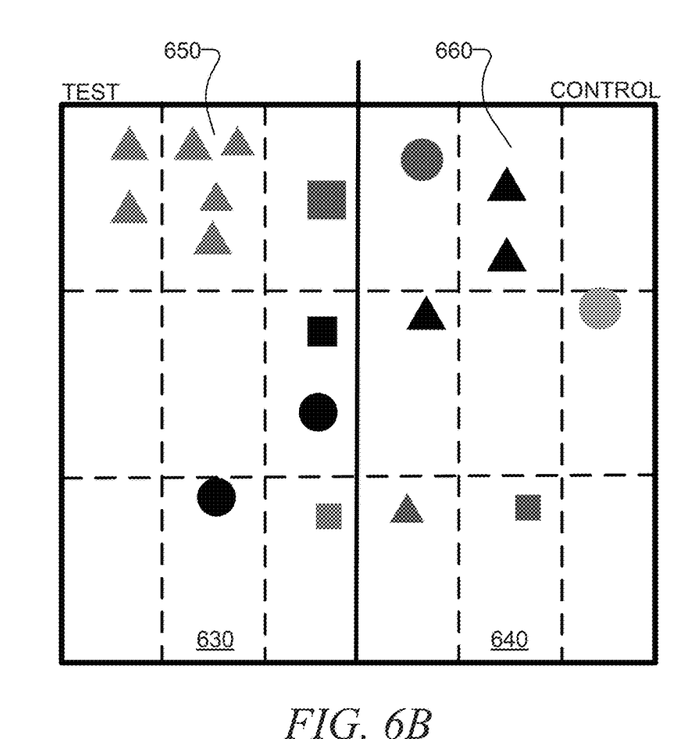
FIG. 6B depicts a diagram illustrating test and control data separated in microsegments, according to various embodiments.

FIG. 6B depicts a diagram illustrating microsegments, such as microsegment 650 of the test group data 630, and its corresponding microsegment pair 660, of the control group data 640. The microsegments 650 and 660, for example, are represented as matching subsets of the test data 630 and control data 640, wherein microsegments 650 and 660 are defined by the same one or more identification variables, with microsegment 650 corresponding to the test group output data defined by the one or more identification variables, and microsegment 660 corresponding to the control group output data defined by the one or more identification variables. Therefore, by calculating a mean-difference corresponding to each microsegment 650 and 660, an effect of the treatment administered to the control group can be isolated and measured.

Example Machine Architecture and Machine-Readable Medium

Figure 7:
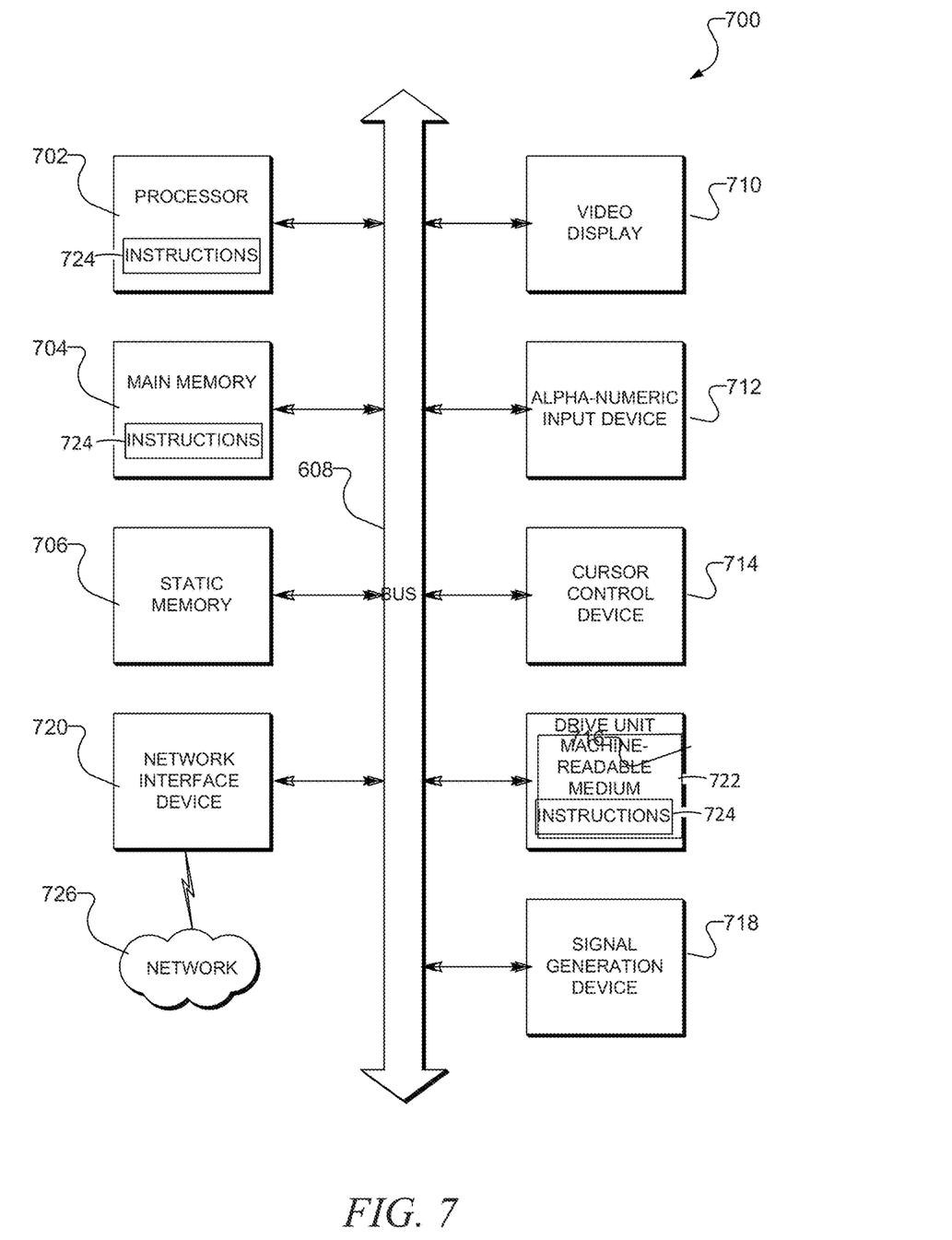
FIG. 7 is a diagrammatic representation of a machine in the example form of a computer system within which a set of instructions, for causing the machine to perform any one or more of the methodologies discussed herein, may be executed.

FIG. 7 is a block diagram of a machine in the example form of a computer system 700 within which instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., central processing unit (CPU), a graphics processing unit (GPU), or both), a main memory 704 and a static memory 706, which communicate with each other via a bus 708. The computer system 700 may further include a video display 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation (e.g., cursor control) device 714 (e.g., a mouse), a drive unit 716, a signal generation device 718 (e.g., a speaker) and a network interface device 720.

Machine-Readable Medium

The drive unit 716 includes a computer-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting computer-readable media 722.

While the computer-readable medium 722 is shown in an example embodiment to be a single medium, the term "computer-readable medium" may include a single medium or multiple media (e.g., a centralized or distributed database, and/or associated caches and servers) that store the one or more instructions 724 or data structures. The term "computer-readable medium" shall also be taken to include any tangible medium that is capable of storing, encoding or carrying instructions 724 for execution by the machine and that cause the machine to perform any one or more of the methodologies of the present disclosure, or that is capable of storing, encoding or carrying data structures utilized by or associated with such instructions 724. The term "computer-readable medium" shall accordingly be taken to include, but not be limited to, solid-state memories, and optical and magnetic media. Specific examples of computer-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMAX networks). The term "transmission medium" shall be taken to include any intangible medium that is capable of storing, encoding or carrying instructions 724 for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the thU range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
    a memory; and
    at least one hardware processor coupled to the memory and comprising instructions that cause the system to perform operations comprising:
    collecting test group data representing users who have received a treatment, wherein the test group data includes a test output value, and a set of identification variables;
    collecting control group data representing users who have not received the treatment, wherein the control group data includes a control output value, and the set of identification variables;
    dividing the test group data and the control group data into one or more microsegments based on a first identification variable from among the set of identification variables, the one or more microsegments including at least a first test microsegment and a first control microsegment, wherein the first test microsegment and the first control microsegment are defined based on the first identification variable;
    calculating a first mean difference between the first test microsegment and the first control microsegment;
    determining that the first mean difference between the first test microsegments and the first control microsegment does not transgress a threshold mean value;
    applying a second identification variable to the first test microsegment and the first control microsegment in response to the determining that the first mean difference does not transgress the threshold mean value;
    calculating a second mean difference between the first test microsegment and the first control microsegment;
    determining that the second mean difference transgresses the threshold mean value;
    creating a list that includes the first identification variable and the second identification variable in response to the determining the second mean difference transgresses the threshold mean value;

selecting one or more users having both the first identification variable and the second identification variable, based on the list; and delivering new content to the one or more users.

2. The system of claim 1 wherein the instructions cause the system to perform operations further comprising:

determining a maximum number of the identification variables corresponding to the one or more microsegments.

3. The system of claim 1 wherein the treatment is an email.

4. The system of claim 1 wherein the new content includes a new email to the one or more users.

5. The system of claim 1 wherein the test output value and the control output value are continuous values.

6. The system of claim 1, wherein the one or more identification values include site activity, demographics, product affinity, and previous communications.

7. A method comprising:

obtaining test group data representing users who have received a treatment, wherein the test group data includes a test output value, and a set of identification variables;

obtaining control group data representing users who have not received the treatment, wherein the control group data includes a control output value, and the set of identification variables;

separating the test group data and the control group data into one or more microsegments based on a first identification variable from among the set of identification variables, the one or more microsegments including at least a first test microsegment and a first control microsegment, wherein the first test microsegment and the first control microsegment are defined based on the first identification variable;

calculating a first mean difference between the first test microsegment and the first control microsegment;

determining that the first mean difference between the first test microsegments and the first control microsegment does not transgress a threshold mean value;

applying a second identification variable to the first test microsegment and the first control microsegment in response to the determining that the first mean difference does not transgress the threshold mean value;

calculating a second mean difference between the first test microsegment and the first control microsegment;

determining that the second mean difference transgresses the threshold mean value;

generating a list that includes the first identification variable and the second identification variable in response to the determining the second mean difference transgresses the threshold mean value;

selecting one or more users having both the first identification variable and the second identification variable, based on the list; and delivering new content to the one or more users.

8. The method of claim 7, further comprising:

selecting one or more users having the one or more identification variables corresponding to the microsegment having the greatest mean-difference between the corresponding test output value and the control output value; and delivering new content to the one or more users.

9. The method of claim 7 wherein the one or more microsegments are defined based on a predetermined maximum number of the one or more identification variables;

wherein the maximum number is determined based on a statistically significant difference in mean between the corresponding microsegments of the test group data and the control group data.

10. The method of claim 7 wherein the treatment is an email containing an incentive.

11. The method of claim 8 wherein the new content is a new email.

12. The method of claim 7 wherein the test output value and the control output value are continuous values.

13. The method of claim 7 wherein the test output value and the control output value represent a gross merchandise bought by the users represented by the test group data and the control group data.

14. The method of claim 7 wherein the one or more identification variables include site activity, demographics, product affinity, and previous communications.

15. A non-transitory computer-readable medium embodying instructions that, when executed by a processor, perform operations comprising obtaining test group data representing users who have received a treatment, wherein the test group data includes a test output value, and a set of identification variables;

obtaining control group data representing users who have not received the treatment, wherein the control group data includes a control output value, and the set of identification variables;

separating the test group data and the control group data into one or more microsegments based on a first identification variable from among the set of identification variables, the one or more microsegments including at least a first test microsegment and a first control microsegment, wherein the first test microsegment and the first control microsegment are defined based on the first identification variable;

calculating a first mean difference between the first test microsegment and the first control microsegment;

determining that the first mean difference between the first test microsegments and the first control microsegment does not transgress a threshold mean value;

applying a second identification variable to the first test microsegment and the first control microsegment in response to the determining that the first mean difference does not transgress the threshold mean value;

calculating a second mean difference between the first test microsegment and the first control microsegment;

determining that the second mean difference transgresses the threshold mean value;

generating a list that includes the first identification variable and the second identification variable in response to the determining the second mean difference transgresses the threshold mean value;

selecting one or more users having, both the first identification variable and the second identification variable, based on the list; and delivering new content to the one or more users.

16. The non-transitory computer-readable medium of claim 15, wherein the operations further comprise:

selecting one or more users having the one or more identification variables corresponding to the microsegment having the greatest difference between the corresponding test output value and the control output value; and delivering content to the one or more users.

17. The non-transitory computer-readable medium of claim 15, wherein the one or more identification variables include site activity, demographics, product affinity, and previous communications.

18. The non-transitory computer-readable medium of claim 15, wherein the test output value and the control output value are continuous values.

* * * * *

UNITED STATES PATENT AND TRADEMARK OFFICE
CERTIFICATE OF CORRECTION

PATENT NO. : 9,754,211 B2  Page 1 of 1
APPLICATION NO. : 14/573985
DATED : September 5, 2017
INVENTOR(S) : Andes Ozbay

It is certified that error appears in the above-identified patent and that said Letters Patent is hereby corrected as shown below:

In the Claims

In Column 14, Line 21, in Claim 15, delete "comprising" and insert -- comprising: --, therefor.

In Column 14, Line 56, in Claim 15, delete "having," and insert -- having --, therefor.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*